(12) United States Patent
Iwasaki et al.

(10) Patent No.: US 9,235,310 B2
(45) Date of Patent: Jan. 12, 2016

(54) APPARATUS TO DETECT DUAL GESTURE ON A RESISTIVE SCREEN

(71) Applicant: Texas Instruments Incorporated, Dallas, TX (US)

(72) Inventors: Mitsuharu Iwasaki, Yokohama (JP); Xiaozhan Liu, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 62 days.

(21) Appl. No.: 13/926,702

(22) Filed: Jun. 25, 2013

(65) Prior Publication Data

US 2014/0002414 A1  Jan. 2, 2014

Related U.S. Application Data

(60) Provisional application No. 61/663,888, filed on Jun. 25, 2012.

(51) Int. Cl.
*G06F 3/045* (2006.01)
*G06F 3/041* (2006.01)

(52) U.S. Cl.
CPC ...... *G06F 3/045* (2013.01); *G06F 2203/04104* (2013.01)

(58) Field of Classification Search
CPC .......... G06F 3/045; G06F 2203/04104; G06F 2203/04808

USPC .................................................. 345/173, 174
See application file for complete search history.

(56) References Cited

U.S. PATENT DOCUMENTS

| 2009/0189877 | A1* | 7/2009 | Washino et al. | 345/174 |
| 2009/0322701 | A1* | 12/2009 | D'Souza et al. | 345/174 |
| 2010/0277417 | A1 | 11/2010 | Sarasmo | |
| 2011/0025642 | A1* | 2/2011 | Tada et al. | 345/174 |
| 2011/0157083 | A1* | 6/2011 | Hershman et al. | 345/174 |

* cited by examiner

*Primary Examiner* — Alexander Eisen
*Assistant Examiner* — Amit Chatly
(74) *Attorney, Agent, or Firm* — Andrew Viger; Frank D. Cimino

(57) ABSTRACT

A resistive touch screen controller provides two-finger gesture recognition. Current mirror circuitry, coupled to the XP/XN and YP/YN conductors, generates a screen current IL corresponding to X/y plate currents, and a corresponding mirror current IL/N. A variable resistor receives mirror current IL/N, and a resistance controller sets the resistance value R1 of the variable resistor, and monitors a variable resistor voltage VR1 based on IL/N*R1. A processor determines calibration voltages for the X and Y plates corresponding to the mirror current IL/N for X/Y voltage values of VR1 for a no touch condition, and X/Y offset voltages VOFS and HOFS of VR1 for a two touch condition. For a two touch condition, the processor determines touch resistance relative to no touch, and generates an adjusted X/Y plate resistance ΔX/ΔY based on VOFS/HOFS, and based on X/Y, determines a distance and angle between the two touches.

7 Claims, 8 Drawing Sheets

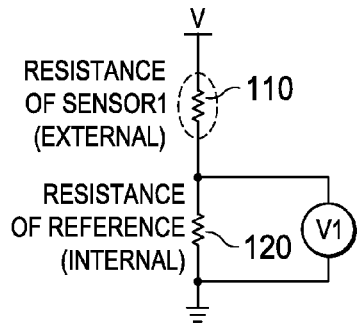
FIG. 1Ai
(PRIOR ART)
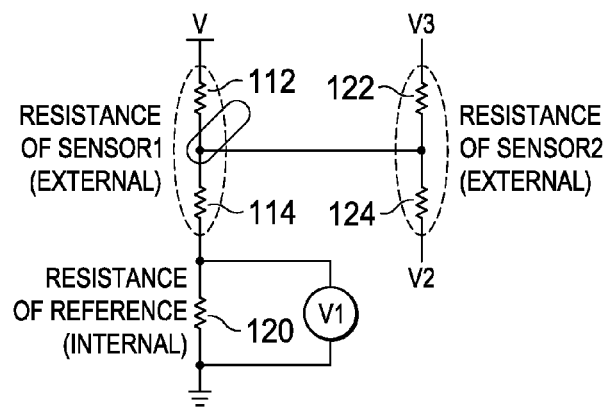
FIG. 1Aii
(PRIOR ART)
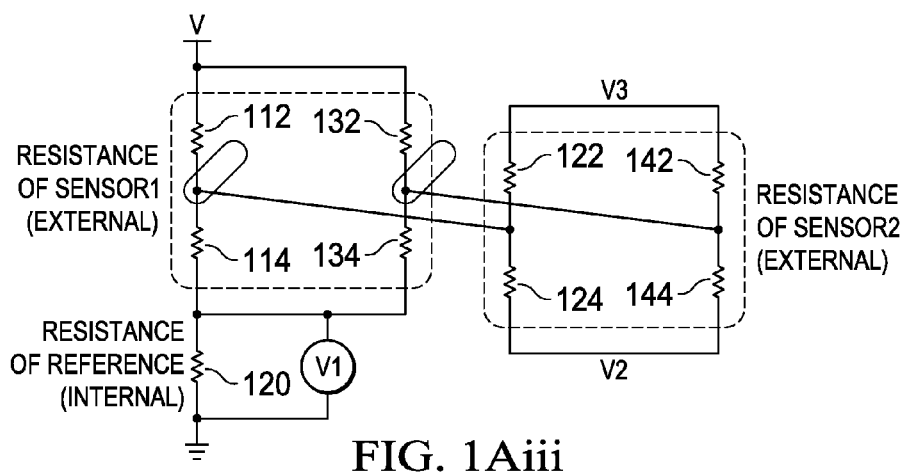
FIG. 1Aiii
(PRIOR ART)

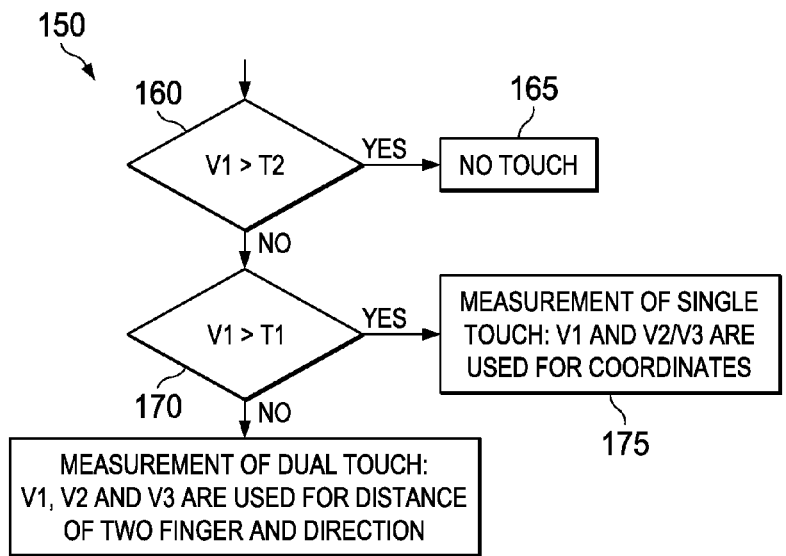
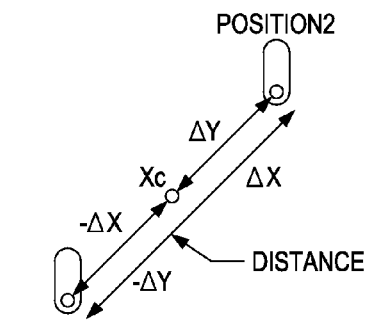
FIG. 1B
(PRIOR ART)
FIG. 1C
(PRIOR ART)
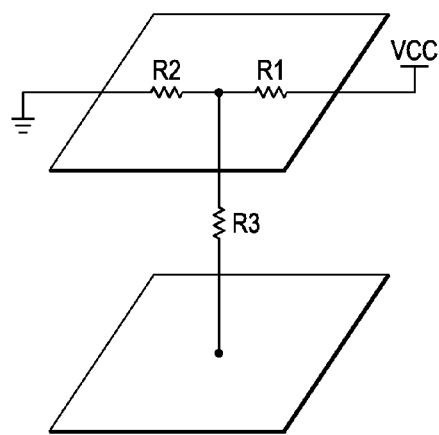
FIG. 2A
(PRIOR ART)
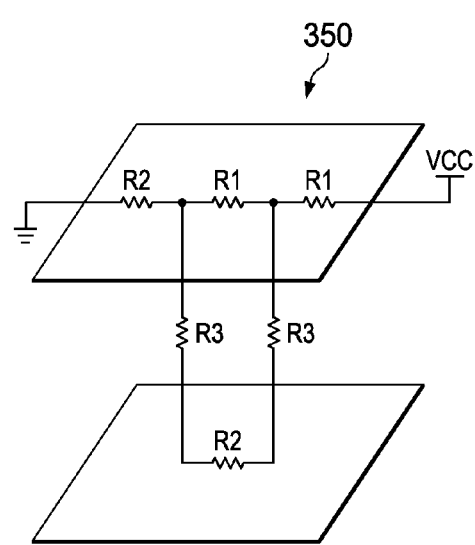
FIG. 2B
(PRIOR ART)

APPARATUS TO DETECT DUAL GESTURE ON A RESISTIVE SCREEN

PRIORITY

This Application claims priority to U.S. Provisional Application No. 61/663,888, filed Jun. 25, 2012, entitled "Dual Touch Gesture That It is Substantially Simultaneous", which is incorporated by reference in its entirety.

TECHNICAL FIELD

This Application is directed, in general, to recognition of a touch gestures and, more specifically, to recognition of touch gestures on a flexible resistive screen.

BACKGROUND

Touch screen controllers ("TSC") are used in a multitude of commercial products, such as "smart" mobile phones, and can also be found in iPhones® or iPads®. TSC can be used either on resistive touch screens or capacitive touch screens. Capacitive TSCs can generate such information as multi-finger placement on a touch screen. However, capacitive touch screens can also be prohibitively expensive. Therefore, resistive touch screens are sometimes used as a less-expensive alternative.

U.S. Patent Publication No. 2010/0277417 A1 to Sarasmo, entitled "Resistive Touch Screen Apparatus, A Method and a Computer Program" is one example of a prior art multi-touch resistive touch screen.

FIGS. 1Ai-1Aii illustrate the Sarasamo resistive TSC approach. F Referring to FIG. 1Ai, a voltage ("V1") is measured across an internal reference resistance 120, as a function of a voltage division between a sensor resistor 110 and the internal reference resistance 120. The prior art TSC recognizes that, for a certain reference voltage V1, a "no touch situation" is indicated, as the voltage V1 is measured as being at a given threshold.

In FIG. 1Aii, in an event of a "single touch", the sensor resistor 110 is bisected or "split" into a first sensor resistor 112 and second sensor resistor 114, and a contact is made at a bottom resistor plate, and the bottom resistor plate is "split" into a first bottom resistor 122 and a second bottom resistor 124. A measurement of voltage V1 is then made over reference resistor 120; this voltage would typically decrease. This decrease in the voltage V1 measured at the reference resistor indicates a "single touch." An amplitude of the reference voltage position of the "single touch" can be used to determine a position of a "single touch."

In FIG. 1Aiii, in an event of a "dual touch", a second part of a resistive screen is touched, represented by a second resistive bisection with a top sensor resistor 132 and 134, and a bottom sensor resistor 142 and 144. This again further lowers a voltage measured across internal sense resistor 120 indicating a "dual touch." Moreover, the voltage measured at the internal reference voltage 120 can indicates a position and orientation of the "dual touch".

The above can be better appreciated in FIG. 1B, an illustration of a prior art method 150 for determining finger positioning.

In FIG. 1B, in a step 160, it is determined whether the reference voltage is above a first, higher threshold ("T2"). If it is, in a step 165, it is determined that no touch has occurred, and the method 150 stops.

In a step 170, it is determined whether the voltage is above a second, lower threshold ("T2"). If it is, in a step 175, it is determined that a "single touch" has occurred, and the reference voltage, and the voltages across the first bottom resistor 122 and the second bottom resistor 124 are measured, and the method 150 stops.

Alternatively, in a step 180, it is then determined that a dual touch has occurred, and the reference voltage, and voltages v2 and v3, which are used for distance of the two fingers input and the orientation of the fingers, are measured.

FIG. 1C illustrates various relationships representing dual finger position and orientation.

In FIG. 2A, a current is measured between a $V_{cc}$ and a ground for a prior art single touch. However, as is illustrated, characteristics of the bottom plate are not measured only a current through the top plate. For purposes of explanation, a single touch does not affect a measured current.

However, in FIG. 2B, two fingers are used, with two different contact positions, and resistor R2 is in series with resistors R3, thereby increasing current, as a parallel current path through R2 in series with R3 in parallel to R1 has been created as used in a prior art dual touch circuit.

FIG. 3A illustrates prior art calculations that can be made regarding location of two fingers.

FIG. 3B illustrates that for a single touch, a current magnitude of "I", such as through R2, is constant and does not change. For a dual touch, however, current magnitude "I" through R2 is in proportion to a distance between two fingers, but not in proportion to the absolute position of the two fingers.

FIGS. 4A and 4B illustrate a prior art circuit 400 for measuring an x position that combines both a single touch measurement and a dual motion measurement of a dual touch. In the circuit 400, a voltage is measured across a sense resistor, such as Rx2, to determine an x position of a single touch. Please note that if the current through the resistor Rx2 is below a given threshold, the touch is deemed a dual touch, and a different analysis applies. For a single finger, this lowers voltage across resistor Rx2.

In FIGS. 4A and 4B, coordinates of a single touch is measured by divided resisters of X/Y plate. In other words, where there is a single touch, Rx1 and RX2 are divided. These resistances are measured, and a ratio is generated. A distance between two touches is also measured by resistors of X/Y plate, although these resistors themselves change value.

Rx1 and Rx2 represent a flexible top plate that is touchable, and Ry1 and Ry2 represent a bottom plate. Moreover, these Rx and Ry resistors are oriented in a perpendicular orientation.

In other words, when there are two touches, the values of each of the resistances change, as well as the ratios between the resistances (due to perpendicular orientation). The distance between two touches is calculated based on a difference between a no touch resistance and two touch resistance for these values. In FIGS. 4A and 4B, $R_c$ represents the resistance that is created when part of a circuit is shorted, as is illustrated in FIG. 3B.

However, there are certain drawbacks associated with the above prior art. For example, it can be expensive and cumbersome to have additional, external circuitry for the two finger measurement in a resistive prior art TSC, such as Sarasmo.

Therefore, there is a need for an improved approach to dual gesture recognition.

SUMMARY

A first aspect provides an apparatus, comprising: a plurality of resistive screen being an upper screen and a lower screen; a configurable resistor coupled to the plurality resitive screens, and a processor coupled to the resistive screens and the resistor, the processor configured to set a resitive value of the resistor as a function of a measured current on the resistive screens through comparing: no touch; single touch; and dual touch. The processor further configured to determine a position of two touches on a screen; and the processor further configured to determine a change of position of at least one of the two fingers, the processor employs a deriviative of the change of current on at least one of the plates over time to determine a characteristic of a change of position.

The apparatus may further comprise at least one of (a) a current mirror coupled to said processor to measure a change of current through said touch screen, (b) an input output device coupled to a bus, the bus also coupled to both the current mirror and the resistor, wherein the processor further configured to calculate an absolute position of a single finger on the touch screens, and (c) setting the resistor at a higher resistance if a single touch is determined than if a dual touch is determined.

A second aspect provides a method, comprising: measuring a current on a top and bottom touch screen, wherein the top touch screen is not being touched; measuring a current on a top and bottom touch screen, wherein the top touch screen is being touched by one finger; measuring a current on a top and bottom touch screen, wherein the top touch screen is being touched by two fingers; calculating a one and a two finger threshold on the touch screens, wherein, if the touch is a two finger touch: calculating an orientation of the two finger touch; and calculating a change of position of at least one finger of the two finger touch, wherein the calculating employs a deriviative of the change of current on at lest one of the plates over time to determine a characteristic of a change of position.

The second aspect may further include calculating the change of position of the two fingers through a slope of a change from a previous position of the two fingers, and wherein the change of positions is selected from the group consisting of: an expansion of the two fingers, a pinching of the two fingers, and a rotation of the two fingers, wherein the position of the two fingers includes an angle between the two fingers, wherein the distance between the two fingers is calculated through a measurement of the change of resistance between the two parallel plates.

BRIEF DESCRIPTION OF THE DRAWINGS

FIGS. 1Ai-1Aiii illustrate a prior art resistive TSC.

FIG. 1B illustrates a prior art method of determining finger positions in the prior art resistive TSC.

FIG. 1C is an illustration of calculation factors for finger positions in the prior art resistive TSC.

FIGS. 2A and 2B are an example of prior art single and dual-touch on a four-wire resistive touch panel.

DETAILED DESCRIPTION

Generally, for a resistive Touch Screen Controller (TSC), which employ dual sets of coordinates to determine a simultaneous two finger touch, the present inventors have recognized that, if one is willing to forego a determination of absolute dual finger position on a resistive TSC, but instead employ information that is related to both the distance between the fingers and the motion of at least one of those fingers, a significant simplification of circuitry can be achieved in recognizing motion of dual touch on a screen, according to the principles of the present Disclosure.

The inventors have also recognized that by utilizing only information from a top plate, and disregarding information from a bottom plate, that a differential of the measured current "I" can be used, wherein the differential of the measured current "I" is a function of a change of distances of the two finger contacts. Recognition of the usefulness of employment of this differential allows a gesture recognition.

Figure 3A:
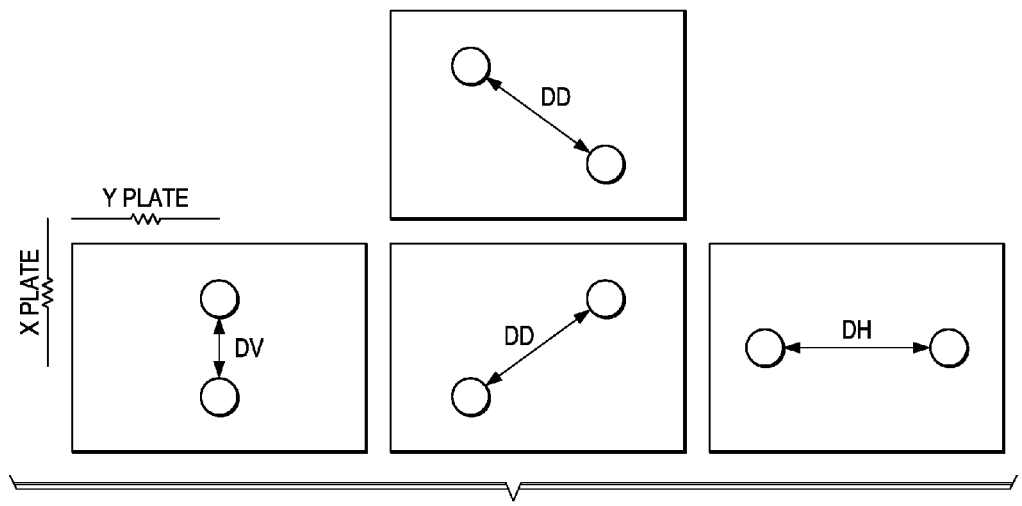
FIGS. 3A-3B illustrate prior art calculations that are made with regard to a prior art dual placement
Figure 3B:
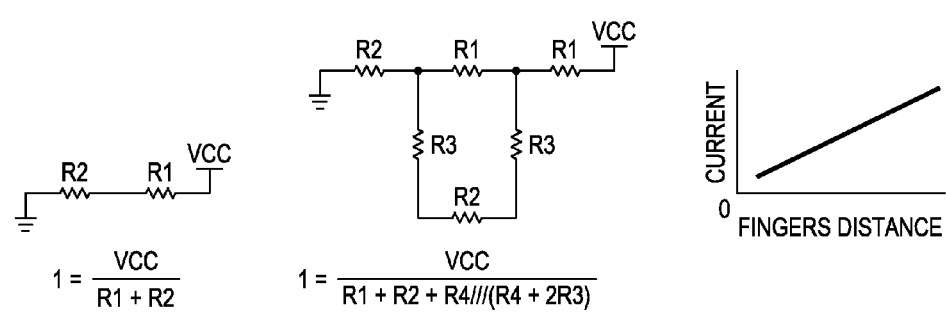
Figure 4A:
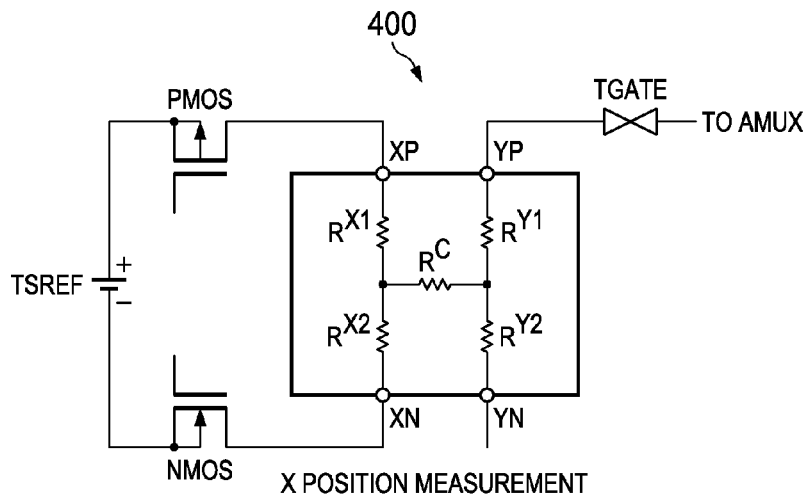
FIGS. 4A-4B illustrate prior art equivalent circuits for location of dual position of two coordinates, which can then be differentiated to determine gesture significance.
Figure 4B:
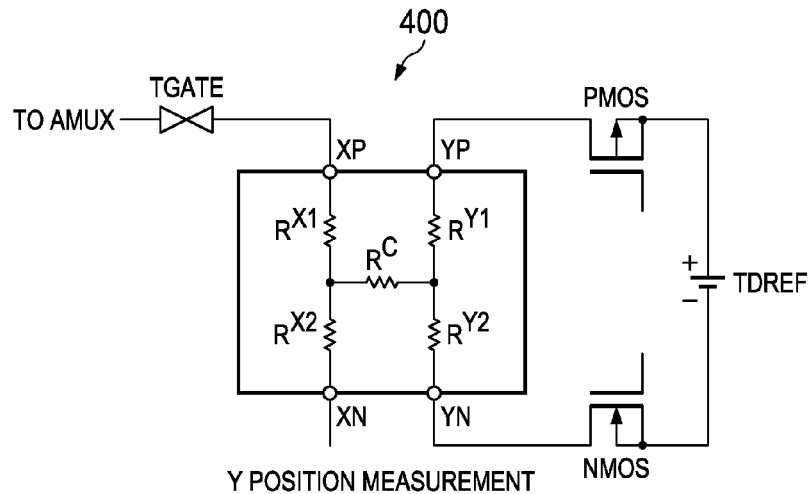
Figure 5:
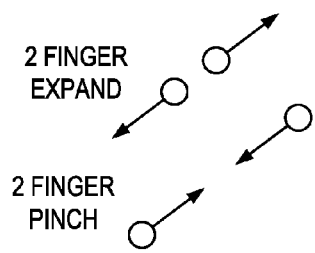
FIG. 5 illustrates a dual gesture motion example.

FIG. 5 illustrates a motion of a dual gesture that can be interpreted by a resistive touch screen of the present Disclosure. As is illustrated, there can be a two finger expansion and a two finger pinch. As understood by the present inventors, a current that is made when at least one touch is moved in relation to another creates a differential of the current. This differential of current can then be measured and used to calculate a dual touch gesture, as will be described in connection with FIGS. 6-9.

Figure 6A:
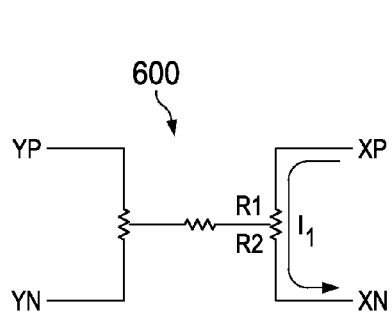
FIGS. 6A and 6B illustrate equivalent circuits that determines both a position and a vector of a dual touch gesture.
Figure 6B:
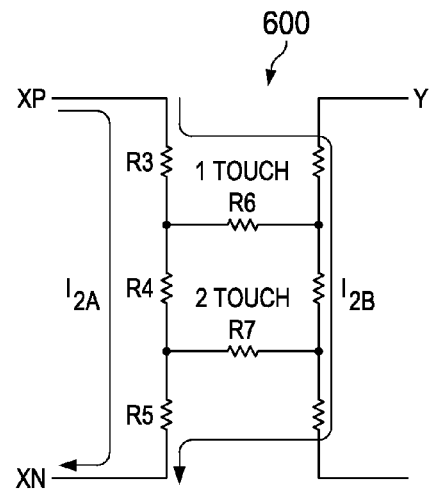

FIGS. 6A-6B illustrate an equivalent circuit 600 for measuring either one finger position (FIG. 6A) or, a two finger position and motion (FIG. 6B).

For one finger touch, the current is greater than a two two finger touch. Therefore, if the current is above a certain level, a one finger touch has been determined, and position and gesture motions occur at that point. However, if the current drops below the two finger threshold, then a two finger touch is detected, with the key parameter being current loss. Once two finger touch is determined, the distance and movement are determined and used to interpolate gestures.

The equivalent circuit in FIG. 6B can be used to determine if either a single touch has occurred if a first current sensor determines that the current is above the first threshold, or determine that a dual touch has occurred if the first current sensor determines that the current is below the first threshold and the second current determines that the current is above the second threshold. If it is determined that a dual touch has occurred, a differential of the current is used to determine at least one direction of motion of at least one member of the dual touch. That is, if I1 is greater than I2A+I2B, then there is a single touch.

Figure 6C:
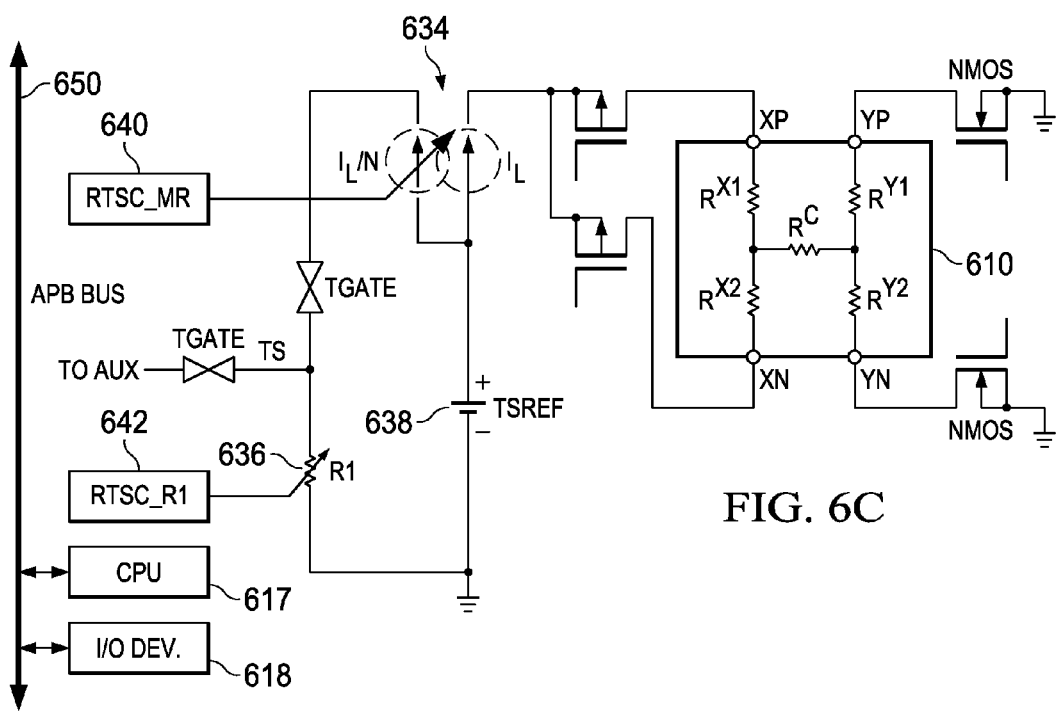
FIG. 6C illustrates an example functional embodiment of a circuit used to determine a touch and a direction of a touch.

FIG. 6C illustrates an equivalent circuit for implementing a single or dual according to this Disclosure.

As is illustrated, a CPU 617 and an input/output/display device 618 are coupled to a bus 650. The bus 650 is coupled to a resistance touch screen controller 640 (RTSC_MR) which controls current mirror 634. The bus 650 is coupled to a variable resistance controller (RTSC_R1) 642. The RTSC_R1 (resistance controller) 642 is coupled to a variable resistor 636. Coupled between the current mirror 634 and the variable resistor 636 is a capacitor 638. Current mirror 634 is coupled through various NMOSs to the touch screen 610.

The circuit can work as follows. The current mirror is monitored by the RTSC_MR 640. This information is passed to the CPU 617. The CPU 617 then determines if a one finger touch or a two finger touch has occurred. If a two finger touch, resistor R1 is set to a lower value than for a two finger touch, by RTSC_R1 642, such as 1K ohms versus 10$k$ ohms.

If the touch is a one touch, then the RTSC_MR 640 monitors the current, and based upon characteristics of the current, determines the motion of a finger, as will be discussed below.

FIG. 7A illustrates a calibration method 700 for a gesture detection circuit, such as that of FIG. 6.

In a step 710, the method 700 enters a panel calibration mode. Measurements of the x and y current are made with no touches occurring.

Step 710 advances to a step 715 and 720 in parallel, wherein 720 is a two finger calibration mode. Here, the two finger threshold current is calculated. This can be at a preset distance, such as one centimeter.

In a step 720, the two finger position calculation is performed to determine a value of offset voltages VOFS and HOFS, which are the differences between the x and y offset coordinate of the two fingers. The absolute value of measurement is taken of the resistances by comparing values off of the X and Y plates. A determination of a two finger touch condition can be found by using the lookup calibration table 715.

In a step 730, a measurement mode is entered into. This measures the currents on the X and Y plates.

In a step 740, resistance is measured in relation to the two finger threshold. The step 740 determines if the resistance is less than the two finger threshold. If not, then it advances to a step for dual touch processing 745. If it is less than for a two finger threshold, then the method advances to a step 750 for one finger touch processing.

In step 745, the x/y coordinates of a one finger touch are reported, which will later on include gesture recognition. In step 750, dual touch processing occurs for the stationary finger positions.

Figure 7:
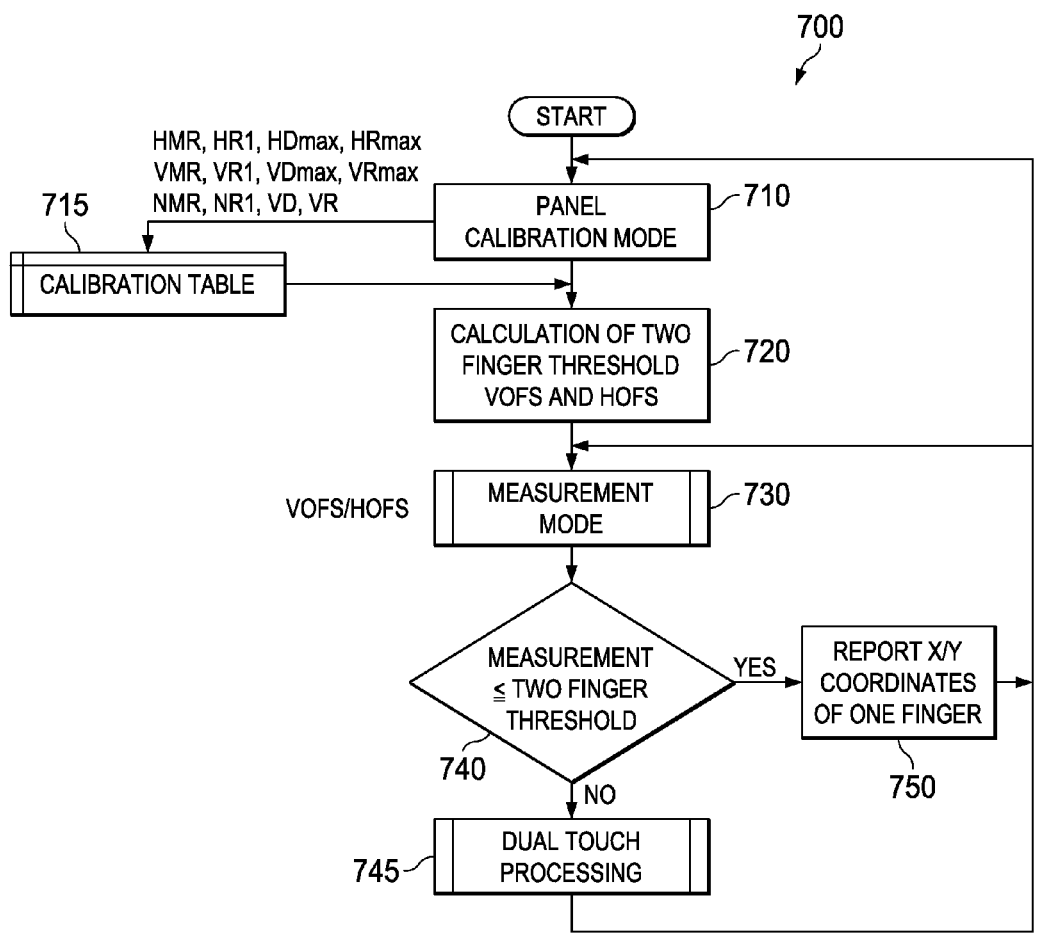
FIG. 7 illustrates a method of calibration and use for a touch and gesture detection circuit of FIG. 6.
Figure 8:
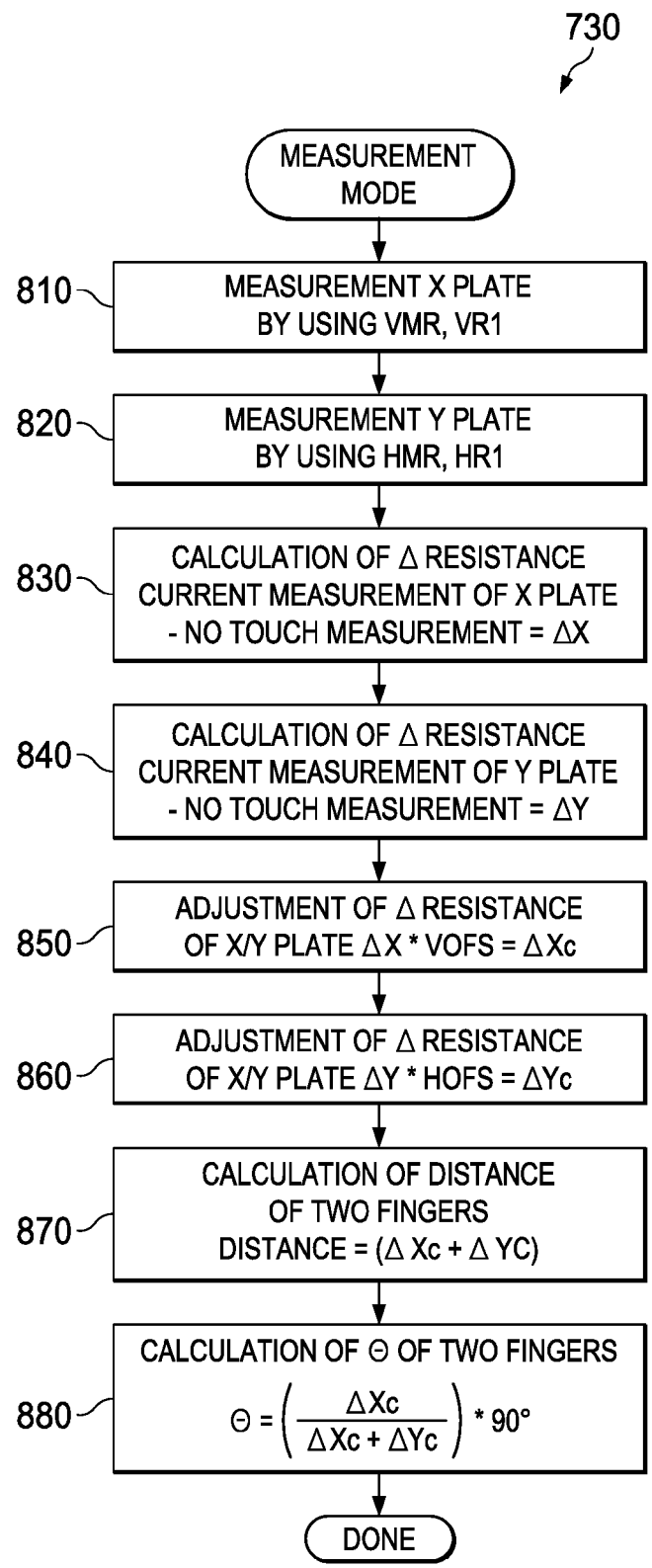
FIG. 8 illustrates a method of a step of a measurement mode of FIG. 7.

FIG. 8 correlates to FIG. 7, step 730, in which measurement mode determines that dual touch condition has occurred.

In a step 810, a position in the X plate is measured by using a reference voltage over a total voltage. There VMR of current mirror 634 and the voltage of the bottom panel of display 610 is used to create a current mirror. In this step, a VMR mirror current ratio 634 is generated based on this current. A current flows from current mirror 634 through capacitor 638 to ground, and from current mirror 634 through variable resistor 636 to ground. An MR signal, along with a value of the selectable resistor 636, is determined by dividing the one current into the other (i.e., from bottom layer of 610 to ground, and between capacitor 638 to ground, In a step 820, a position in the Y plate is measured analogously.

In a step 830, a calculation of a change of resistance in the x plate is made. In this step, the current measurement minus "no touch measurement", is change of resistance.

In a step 840, a calculation of a change of resistance in the y plate minus the initial "no touch measurement" for yΔ, is change of resistance.

In a steps 850 and 860, an adjustment of a change in resistance of X/Y plates are made based on the offset voltages VOFS/HOFS. In other words, determining the absolute position of each finger, not just relative to each other.

In a step 870, a calculation of distance of two fingers occurs. This calculation of the distance the change of resistivity measured in the X and Y plate between initial measurement, and with both fingers on the touch plates.

In a step 880, the angle of orientation of two fingers is calculated.

Figure 9:
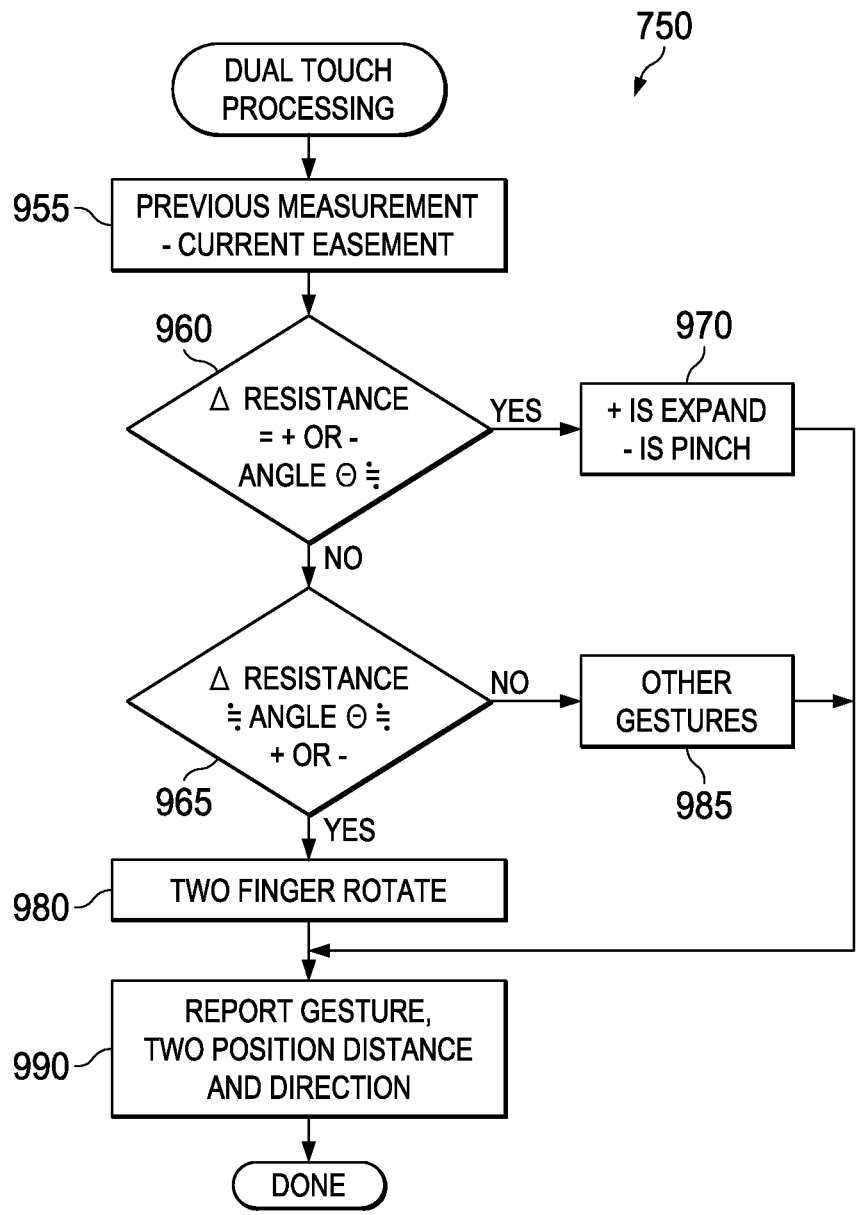
FIG. 9 illustrates a method of a step of dual touch processing of FIG. 7.

In FIG. 9, correlates to FIG. 7, step 745750 for of dual touch processing. In step of 955, a previous measurement of x and y resistances, determined from X and Y plate currents (FIG. 7, step 740), are compared to a present resistance on the X and Y plates. In one embodiment, the processor employs a deriviative of the change of current on at lest one of the plates over time to determine a characteristic of the position.

In a step 960, it is determined if a change has occurred between a resistance value, but no change in the calculated angle. If yes, step 960 advances to a step 970. If not the method step 960 advances to a step 965. The change of resistance can be positive for an expanding position in the relation of the x and y directions. The slope of this change is the percentage change. Moreover, the x and y measurements are compared to each other to determine direction.

In a step 965, it is determined if a change has occurred between a resistance value, but no change has occurred in the calculated angle. This is done by comparing the x and y coordinates, and changes in values of x and y coordinates. If true, step 965 advances to a step 980. If false the step 965 advances to a step 985.

In a step 970, it is determined whether a gesture is an expansion or a pinch.

In a step 980, it is determined whether a two finger rotation has occurred.

In a step 985, it is determined whether one or more other gestures have occurred.

In a step 990, a gesture, two-finger distance, and orientation are reported) through the I/O device 618 in FIG. 6) based on measurements from the previous steps 960, 965, 970, 980, 985.

U.S. Patent Publication No. 2010/0277417 A1 to Sarasmo, entitled "Resistive Touch Screen Apparatus, A Method and a Computer Program" ("Sarasmo,") is hereby incorporated by reference in its entirety.

Those skilled in the art to which this application relates will appreciate that other and further additions, deletions, substitutions and modifications may be made to the described embodiments.

What is claimed is:

1. A system suitable for use with a resistive touch screen to provide two-finger gesture recognition, comprising:
    a resistive touch screen with X and Y plates, with respective V and H orthogonal dimensions, the X plate with XP and XN conductors, and the Y plate with YP and YN conductors;
    a current measuring circuit coupled to the XP/XN and YP/YN conductors, and including;
        current mirror circuitry coupled to the XP/XN and YP/YN conductors, generating a screen current IL corresponding selectively to X and Y plate currents, and a corresponding mirror current IL/N as a ratio N of the screen current IL;
        a current mirror monitor configured to monitor the mirror current IL/N;
        a variable resistor coupled to receive the mirror current IL/N,
        a resistance controller configured to set the resistance value R1 of the variable resistor, and to monitor a variable resistor voltage VR1 based on IL/N*R1; and
    a processor coupled to the mirror current monitor and the resistance controller, the processor configured to
        determine calibration voltages for the X and Y plates corresponding to the mirror current IL/N for vertical X and horizontal Y voltage values of VR1 for a no touch condition, and vertical X and horizontal Y offset voltage values VOFS and HOFS of VR1 for a two touch condition, and for a two touch condition, the processor further configured to for X plate, determine touch resistance relative to no touch, and generate an adjusted X plate resistance ΔX based on vertical offset VOFS;

for Y plate, determine touch resistance relative to no touch, and generate adjusted Y plate resistance ΔY based on horizontal offset HOFS;

determine a distance between the two touches based on adjusted ΔX and ΔY;

determine an angle between the two touches based on adjusted ΔX and ΔY.

2. The system of claim 1, further comprising wherein both fingers are moved in a change of distance between two touches that is determined by the processor as either an expansion or a pinch based on a derivative of a change of current for at least one of the plates.

3. The system of claim 1, wherein generation of adjusted X plate resistance ΔX is based on ΔX*VOFS=ΔX$_c$; and wherein generation of adjusted Y plate resistance ΔY is based on ΔY*HOFS=ΔY$_c$.

4. The system of claim 3, wherein the distance between two touches is determined based on (ΔX$_c$+ΔY$_c$).

5. The system of claim 3, wherein the angle θ between two touches is determined based on [θ={[ΔX$_c$/(ΔX$_c$+ΔY)*90°].

6. The apparatus of claim 1, further comprising wherein the resistance value R1 of the variable resistor is set at a lower resistance if a single touch is determined than if a dual touch is determined.

7. The apparatus of claim 1, wherein both fingers are moved in a change of angle between two touches that is determined by the processor as a two finger rotation.

* * * * *